US010077111B2

(12) United States Patent
Papke et al.

(10) Patent No.: US 10,077,111 B2
(45) Date of Patent: Sep. 18, 2018

(54) HINGE FOR ENLARGING THE VOLUME OF AN AIRCRAFT STORAGE BIN

(71) Applicant: B/E Aerospace, Inc., Wellington, FL (US)

(72) Inventors: Robert Papke, Camano Island, WA (US); Shawn Claflin, Seattle, WA (US)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 15/477,071

(22) Filed: Apr. 1, 2017

(65) Prior Publication Data
US 2017/0283058 A1 Oct. 5, 2017

Related U.S. Application Data

(60) Provisional application No. 62/316,929, filed on Apr. 1, 2016.

(51) Int. Cl.
B64D 43/00 (2006.01)
B64D 11/00 (2006.01)
B65D 43/16 (2006.01)

(52) U.S. Cl.
CPC .......... B64D 11/003 (2013.01); B65D 43/16 (2013.01); B64D 11/00 (2013.01); B64D 2011/0046 (2013.01)

(58) Field of Classification Search
CPC .... A47F 2003/008; A47F 5/04; A47F 3/0408; A47F 3/0413; A47F 3/0434; A47F 3/0491; A47L 15/4261; E05C 19/06; Y10T 24/3918; B65D 11/00; B65D 11/003; A47B 96/1425

USPC .......... 16/78, 254–272; 312/319.2, 327, 328, 312/323, 138.1, 139, 139.1; 248/220.21, 248/222.11; 49/240, 260; 244/118.1, 244/118.5

See application file for complete search history.

(56) References Cited

U.S. PATENT DOCUMENTS 1,345,194 A * 6/1920 Johnson ................. A47B 13/00
                                                    312/204
2,492,697 A * 12/1949 Higley .................... A47B 88/80
                                                    312/204
2,791,681 A * 5/1957 Evans ........................ F21S 8/02
                                                    16/232
2,950,157 A * 8/1960 Buzicky .................. F25D 25/00
                                                    312/127
4,490,883 A * 1/1985 Gauron .................... B64C 1/066
                                                    16/245

(Continued)

FOREIGN PATENT DOCUMENTS

EP            0557267      * 8/1993

Primary Examiner — Janet M Wilkens
(74) Attorney, Agent, or Firm — Clements Bernard Walker PLLC

(57) ABSTRACT

In a preferred embodiment, a retrofit storage bin door hinge includes an extension member than increases the storage volume of the bin by at least 5 percent or 10 percent, thereby permitting the storage of larger carry-on bags. Required access to the ceiling panels during maintenance operations is preserved by the hinges pivotable attachment to a pivot mount attached to the ceiling of a storage bin. In this manner, the hinge assembly and door may be readily translated downwardly to provide full access to the ceiling panels during a maintenance operation.

20 Claims, 13 Drawing Sheets

(56) References Cited

U.S. PATENT DOCUMENTS

| | | | | |
|---|---|---|---|---|
| 4,842,349 A * | 6/1989 | Stenemann | ............ | A47F 3/007 312/116 |
| 5,129,597 A * | 7/1992 | Manthey | ............ | B64D 11/003 244/118.5 |
| 5,639,149 A * | 6/1997 | Grassmuck | ............ | A47F 3/007 277/645 |
| 5,687,929 A * | 11/1997 | Hart | ............ | B64D 11/003 244/118.1 |
| 5,711,505 A * | 1/1998 | Nemoto | ............ | B60N 2/01516 248/424 |
| 5,938,149 A * | 8/1999 | Terwesten | ............ | B64D 11/003 244/118.5 |
| 6,290,175 B1 * | 9/2001 | Hart | ............ | B64D 11/003 244/118.1 |
| 6,634,460 B1 * | 10/2003 | Hackenberg | ............ | A47F 3/007 186/38 |
| 8,091,844 B1 * | 1/2012 | Bragg | ............ | F24F 13/32 248/208 |
| 8,292,376 B1 * | 10/2012 | Stelmasik | ............ | E05F 1/1091 312/139 |
| 2005/0040287 A1 * | 2/2005 | Stephan | ............ | B61D 37/003 244/118.5 |
| 2008/0174216 A1 * | 7/2008 | Bries | ............ | A47F 3/005 312/138.1 |
| 2015/0030319 A1 * | 1/2015 | Matori | ............ | G03B 17/561 396/419 |

* cited by examiner

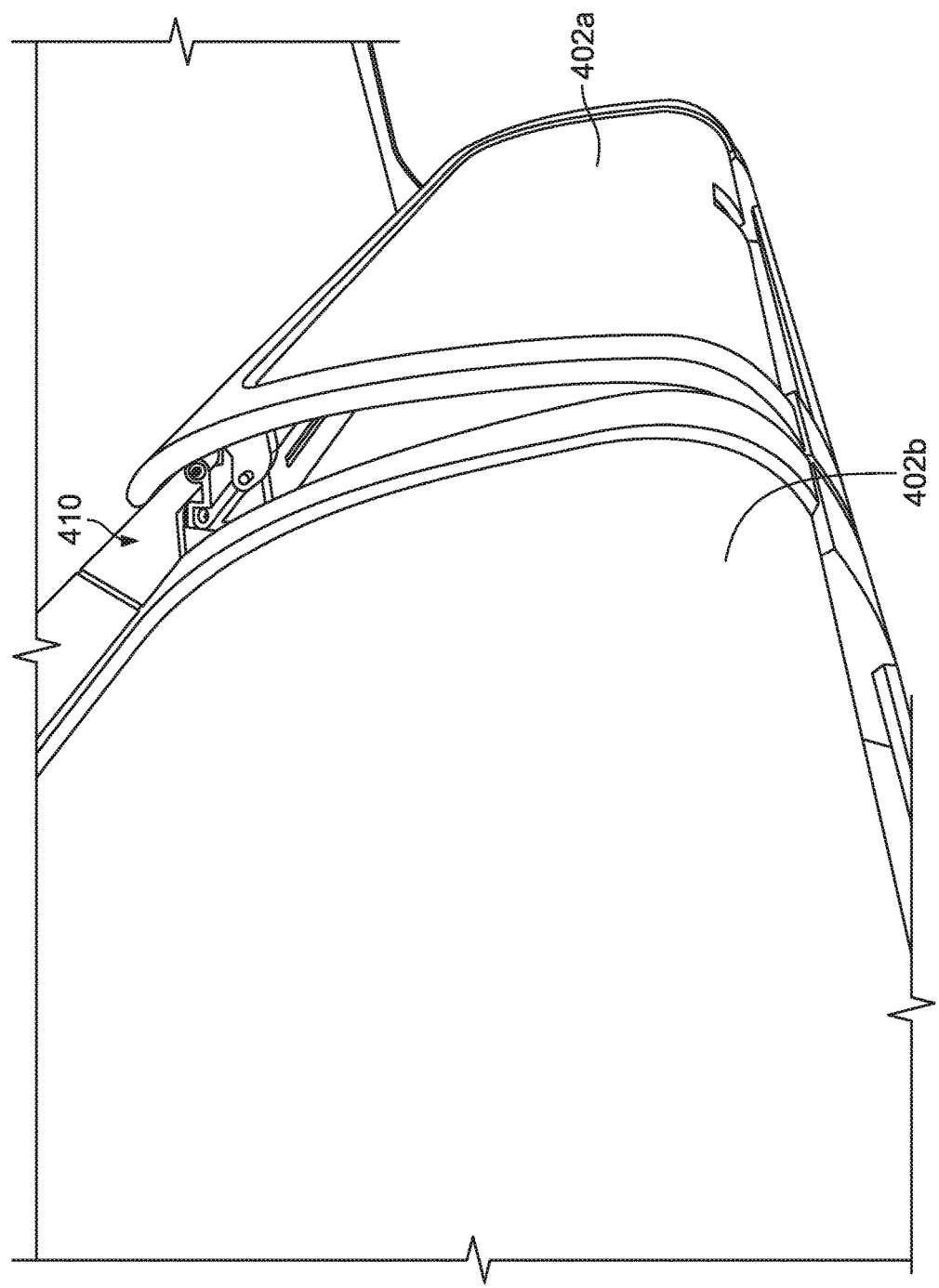

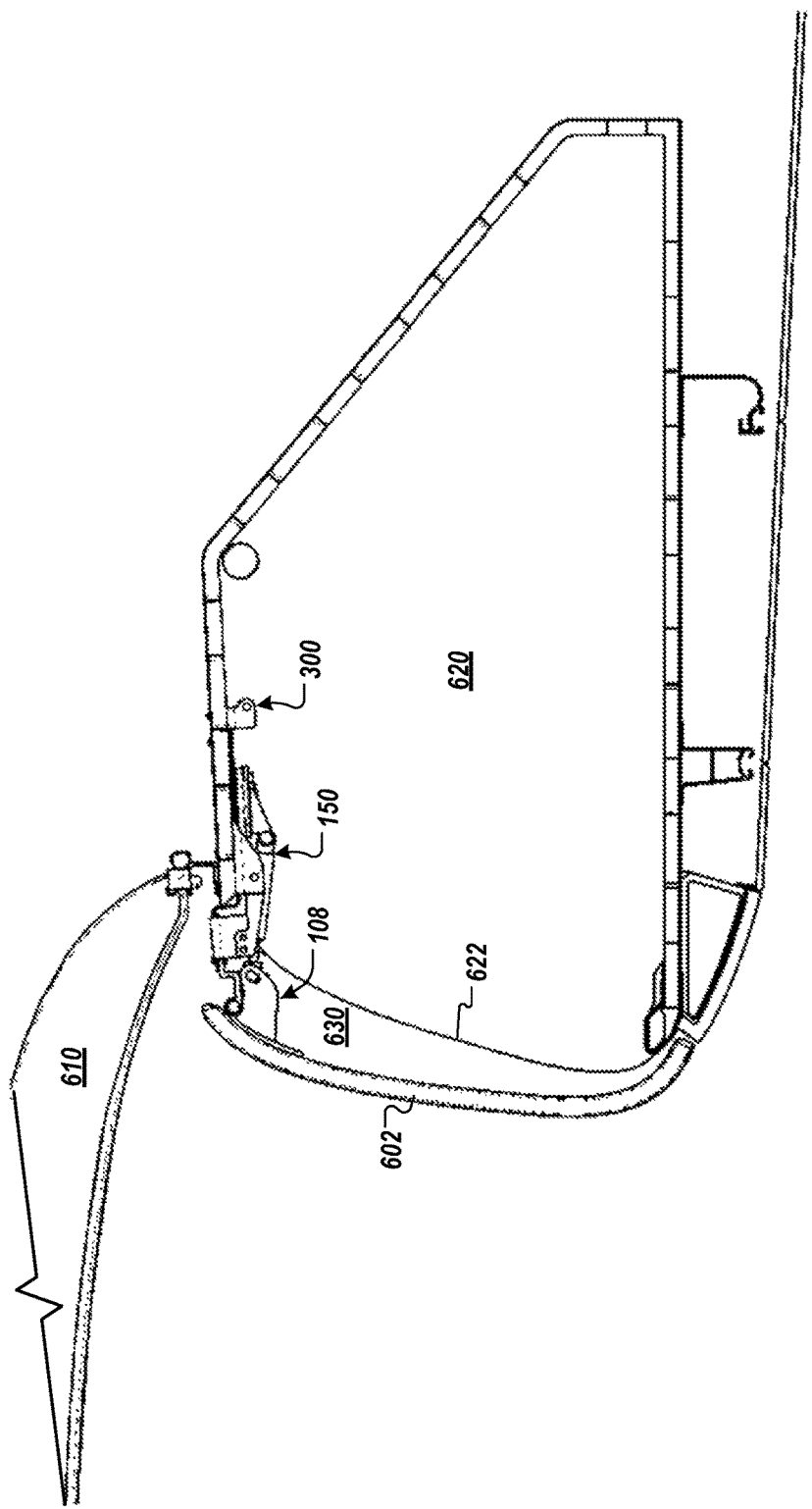

HINGE FOR ENLARGING THE VOLUME OF AN AIRCRAFT STORAGE BIN

RELATED APPLICATIONS

This application claims priority to U.S. Provisional Patent Application Ser. No. 62/316,929, entitled "Bin Door Extension Bracket," filed Apr. 1, 2016, the contents of which is herein incorporated by reference in their entirety.

BACKGROUND

In commercial aircraft, overhead stowage bins are provided for storing passenger belongings during flight. Overhead stowage bin designs usually require that typical carry-on luggage be oriented sideways with handles and wheels forward or aft. When passenger carry-on luggage fails to fit in these configurations, cabin attendants initiate time consuming gate check procedures to load the remaining carry-on items onto the aircraft.

Moreover, older aircraft tend to have smaller storage bins into which it is more difficult to fit modern carry-on bags. Heretofore it has been impractical to modify the storage bins because of the requirement that the ceiling panels should be fully accessible and removable during maintenance. The conventional belief, therefore, has been that the outer envelope of the storage bin should not or cannot be modified.

There exists a long-felt need for a solution that enhances the space of the storage bins of older aircraft in a cost effective manner while preserving the required access to ceiling panels during maintenance operations.

SUMMARY OF ILLUSTRATIVE EMBODIMENTS

In a preferred embodiment, a retrofit storage bin door hinge includes an extension member that increases the storage volume of the bin by at least 5 percent or 10 percent, thereby permitting the storage of larger carry-on bags. Required access to the ceiling panels during maintenance operations is preserved by the hinge's pivotable attachment to a pivot mount attached to the ceiling of a storage bin. In this manner the hinge assembly and door may be readily translated downwardly to provide full access to the ceiling panels during a maintenance operation. In one aspect, a method of retrofitting an aircraft storage bin comprising a storage bin including an upper surface and a door hingeably coupled to the storage bin, wherein the door and storage bin at least partially define an enclosed storage bin space when the door is in a closed position, comprises installing a pivot mount attached to the upper surface of the storage bin, installing a hinge body member extending from the pivot mount toward the door of the storage bin, the hinge body member having a first portion rotatably coupled to the pivot mount and having a second portion releasably attached to the upper surface of the storage bin such that the second portion can pivot downwardly when the second portion is released from the upper surface, installing a piston member carried by the hinge body member, the piston member having a first end coupled to the hinge body member and a second end coupled to the door such that the piston member is carried downwardly when the hinge body member pivots downwardly, wherein the piston member actuates as the door is moved from the closed position to an open position, and installing an extension member that bridges a gap between the door and the upper surface of the storage bin, the extension member having an end hingedly coupled to the door, wherein said gap corresponds to a distance that an upper edge of the door is positioned laterally relative to a position of the edge prior to installation of said extension member, such that the enclosed storage bin space after installation of the extension member is larger relative to the storage bin space prior to installation of said extension member.

In a further aspect, the hinge body member may be configured to permit the door to be translated downwardly to permit access to and removal of ceiling panels without decoupling the door from the storage bin. In another aspect, the mounting position of the first end of the piston member is adjustable relative to the hinge body member. In another aspect, the extension member is integrally formed with the hinge body member.

In certain embodiments, the hinge body member is releasably attached to the upper surface of the storage bin via at least one flange extending from the upper surface of the storage bin. The hinge body member may be released from the upper surface of the storage bin by removal of at most two pins or fasteners. The method may further include installing a shroud member substantially covering the hinge body member and the pivot member.

The retrofitting method may increase the storage bin space relative to the storage bin space prior to installation of said extension member. The method may increase the storage bin space by 1, 2, 3, 4, 5, 6, 7, 8, 9, 10, 11, 12, 13, 14, 15, 16, 17, 18, 19, or 20 percent.

In certain embodiments, the retrofitting method may further include installing a second hinge body member, a second piston member and a second extension member spanning said gap. The forgoing general description of the illustrative implementations and the following detailed description thereof are merely exemplary aspects of the teachings of this disclosure, and are not restrictive.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings:

FIG. 4A is a perspective view of a storage bin door connected to the overhead storage bin using a bracket hinge assembly with bracket extension, illustrating a difference between an existing bin door orientation and a space that is added by using the bracket hinge assembly according to the first or the second embodiment;

FIG. 6A is a cross-section of a portion of an aircraft compartment including a ceiling panel section, a storage bin section having a front bin edge, and a hinge portion connecting the bin door to the storage bin using the bracket hinge assembly shown in FIG. 3A according to an embodiment;

DETAILED DESCRIPTION OF ILLUSTRATIVE EMBODIMENTS

Figure 1A:
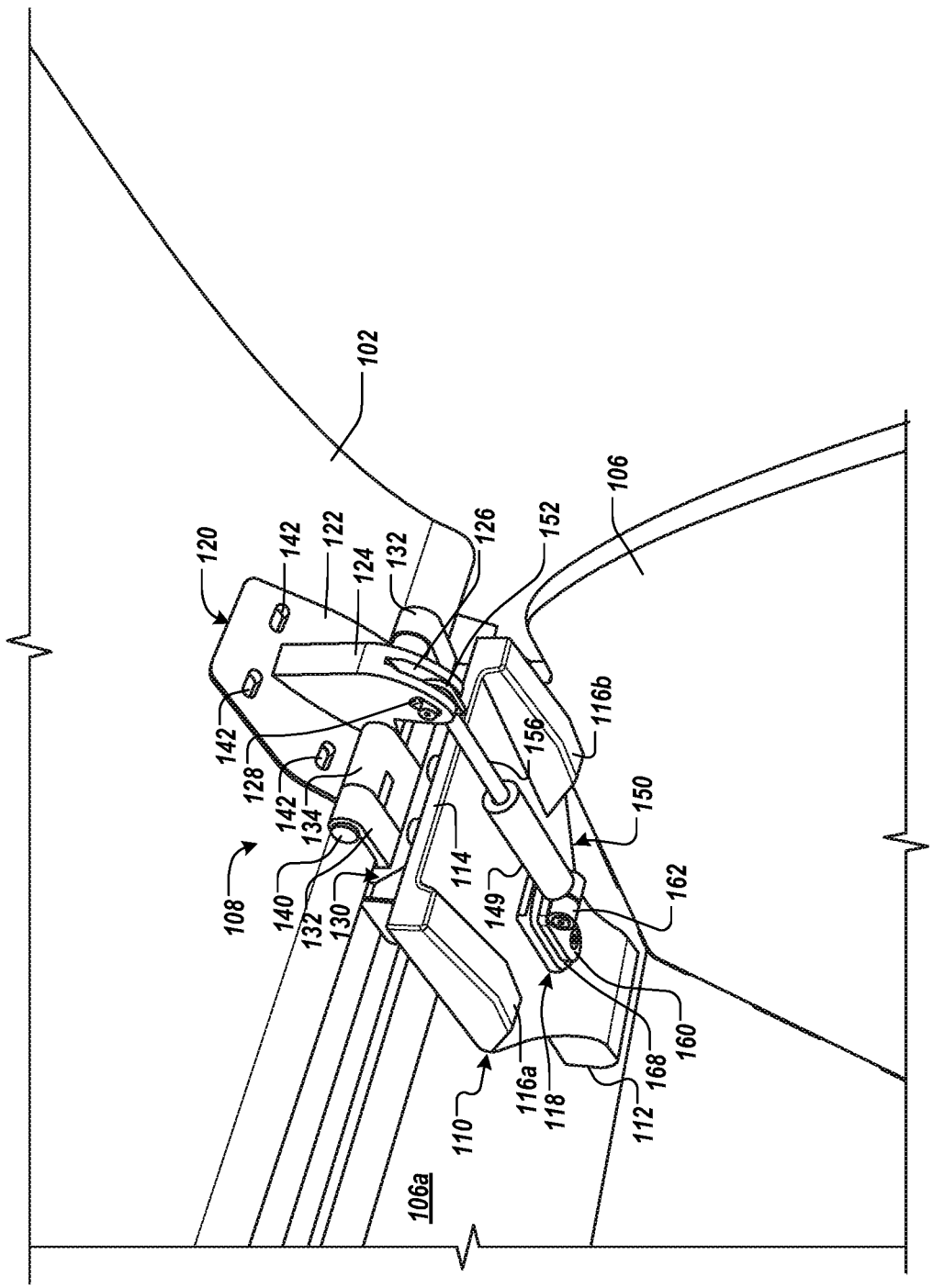
FIG. 1A is a perspective view of an installed bracket hinge assembly connecting a storage bin door to an overhead storage bin for a commercial aircraft interior according to an embodiment.

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

It must be noted that, as used in the specification and the appended claims, the singular forms "a," "an," and "the" include plural referents unless the context expressly dictates otherwise. That is, unless expressly specified otherwise, as used herein the words "a," "an," "the," and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "about," "proximate," "minor variation," and similar terms generally refer to ranges that include the identified value within a margin of 20%, 10% or preferably 5% in certain embodiments, and any values therebetween.

All of the functionalities described in connection with one embodiment are intended to be applicable to the additional embodiments described below except where expressly stated or where the feature or function is incompatible with the additional embodiments. For example, where a given feature or function is expressly described in connection with one embodiment but not expressly mentioned in connection with an alternative embodiment, it should be understood that the inventors intend that that feature or function may be deployed, utilized or implemented in connection with the alternative embodiment unless the feature or function is incompatible with the alternative embodiment.

A bracket hinge assembly is provided to substantially increase a capacity of a commercial aircraft overhead storage bin, while maintaining existing storage bins and bin doors. Addition of the disclosed bracket hinge assembly allows a "wheels-first" orientation, which in turn provides space for an additional carry-on bag in each storage bin. By reorienting an existing bin door with the bracket hinge assembly, more storage bin volume is created. To minimize cost, the disclosed bracket hinge assembly may permit reuse of all of the existing components as well as existing bin door hinge mounting locations. Salvaged parts can be re-assembled with components of the disclosed bracket hinge assembly resulting in a substantial saving of time when considering a complete ship-set retrofit.

In addition to the enlarged opening described above, the disclosed bracket hinge assembly permits the bin door to pivot down into a maintenance mode to allow access to and removal of adjacent ceiling tiles. This unique design feature allows the existing bin door to rotate down and away for ceiling panel access and/or removal, while still remaining attached to the storage bin with no loose parts. This may result, for example, in maintaining original equipment manufacturer (OEM) specifications for an existing ceiling panel removal procedure.

FIG. 1A is a perspective view of an installed quick release bracket hinge assembly 110, for example a bracket hinge assembly 300 (See FIG. 3A), connecting a storage bin door (bin door) 102, shown in an open configuration, to an overhead storage bin (storage bin) 106 for a commercial aircraft interior according to an example embodiment. As shown, the installed bracket hinge assembly 110 includes a shroud 112 covering components of the bracket hinge assembly 110, for example to prevent pinching of passenger items within the mechanisms or to protect from dust or damage to the mechanisms. In some implementations, the bracket hinge assembly 110 can be configured for use with existing hinge hardware. In an example, the shroud 112 can include one or more apertures 118 to secure a pre-existing strut assembly 150 (discussed in greater detail below in relation to FIG. 1C), and a pair of projections 116a-b to accommodate portions of the individual components of the bracket hinge assembly 110.

Figure 1B:
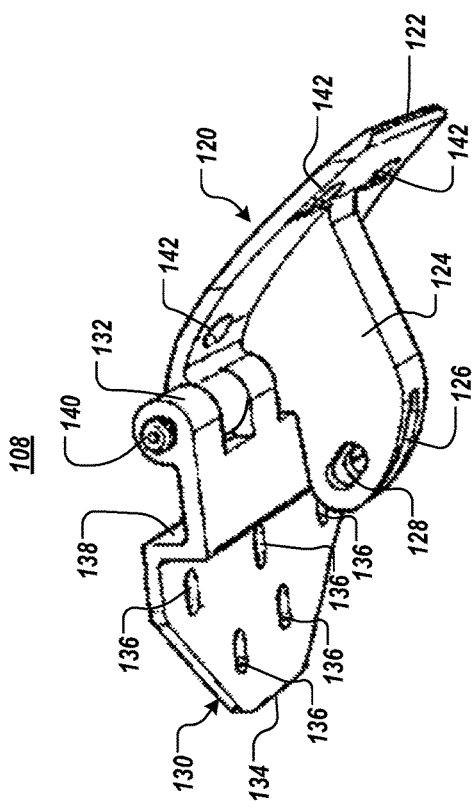
FIG. 1B is a perspective view of an example bin door hinge assembly including a bin mount hingedly connected to a door mount, for example with a pin.

As shown in FIGS. 1A and 1B, the preexisting bin door hardware configured for mating with the bracket hinge assembly 110, in some embodiments, may include a bin door hinge 108 (discussed in greater detail below in relation to FIG. 1B) including a bin mount 130 hingedly connected to a door mount 120, for example with at least one pin 140.

In an example, the door mount 120 can have a curved structure 122 configured to complement a curvature of the bin door 102. In an example, the door mount 120 can secure to the bin door 102 using a set of fasteners through a set of apertures 142 of the curved structure 122.

The bin door 102 is hinged in such a manner as to permit maximum access to an interior of the storage bin 106 when the bin door 102 is open in order to facilitate placement into and removal from the storage bin 106 of passenger luggage items. In operation, the bin door 102 swings upwards at a hinge assembly including mated hinge elements 132, 134, 140, and the gas strut 149 of the gas strut assembly 150 extends, pushing out a piston 156 to assist in lifting the bin door 102 toward a ceiling of the aircraft cabin. Conversely, upon shutting the bin door 102, the piston 156 of the strut assembly 150 pushes into the gas strut 149, dampening closing and loading a spring mechanism that assists during re-opening. While the strut assembly 150 in conventional door bracket mechanisms connects directly to an upper surface 106a of the storage bin 106, in the illustrated embodiment, a bracket assembly 110 is included to extend the position of the strut assembly 150 outward toward an aisle from a conventional mounting position proximate a rear of the shroud 112, providing increased bin storage capacity. Other benefits of such bracket assemblies 110 are described below in example embodiments of FIGS. 2A through 2D and FIGS. 3A through 3C.

FIGS. 2A through 2D illustrate a first example of a bracket hinge assembly providing increased capacity for a storage bin and also enabling a maintenance position for more readily accessing a ceiling panel mounted above the storage bin (e.g., storage bin 106 of FIG. 1A). In summary, a pivot mount 204 is attached to the upper surface of the storage bin. A hinge body member 202 extends from the pivot mount 204 toward the door of the storage bin, the hinge body member having a first portion 252 rotatably coupled to the pivot mount 204 and having a second portion 230 releasably attached to the upper surface of the storage bin such that the second portion can pivot downwardly when the second portion is released from the upper surface. The piston member 150 is carried by the hinge body member 202 and has a first end 280c coupled to the hinge body member and a second end 154 coupled to the door such that the piston member is carried downwardly when the hinge body member pivots downwardly. The piston member 150 actuates as the door is moved from the closed position to an open position. An extension member 220 bridges a gap between the door and the upper surface of the storage bin, the extension member having an end hingedly coupled to the door. The gap corresponds to a distance that an upper edge of the door is positioned laterally relative to a position of the edge prior to installation of said extension member, such that the enclosed storage bin space after installation of the extension member is larger relative to the storage bin space prior to installation of said extension member, wherein the hinge body member is configured to permit the door to be translated downwardly to permit access to and removal of ceiling panels without decoupling the door from the storage bin. A mounting position 164 of the first end 160 of the piston member is adjustable relative to the hinge body member. The extension member 220 may integrally formed with the hinge body member or formed as a separate piece. The hinge body member 202 may releasably attached to the upper surface of the storage bin via at least one flange 312 extending from the upper surface of the storage bin. The hinge body member 202 may be released from the upper surface of the storage bin by removal of at most two pins or fasteners installed in apertures 314, 364. A shroud member 110 may substantially cover the hinge body member 202 or the pivot member. The enclosed storage bin space may be at least 5 percent or 10 percent larger relative to the storage bin space prior to installation of said extension member. The retrofitting method described herein may increase the storage bin space by at least 1, 2, 3, 4, 5, 6, 7, 8, 9, 10, 11, 12, 13, 14, 15, 16, 17, 18, 19, or 20 percent. The storage bin may be equipped with a second hinge body member, a second piston member and a second extension member spanning the gap.

Figure 2A:
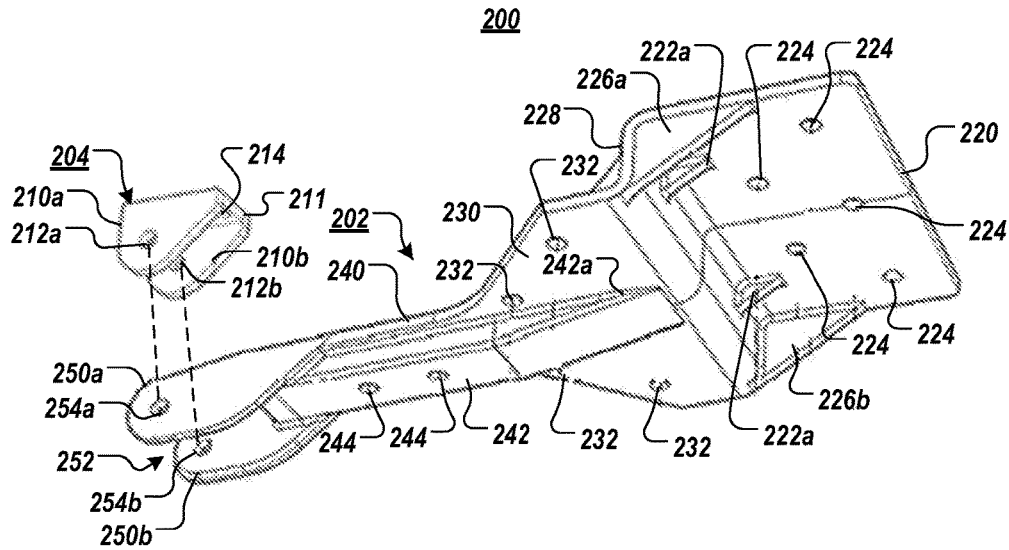
FIG. 2A is a perspective view of a bracket hinge assembly including a bracket extension and a pivot anchor according to a first embodiment.
Figure 2B:
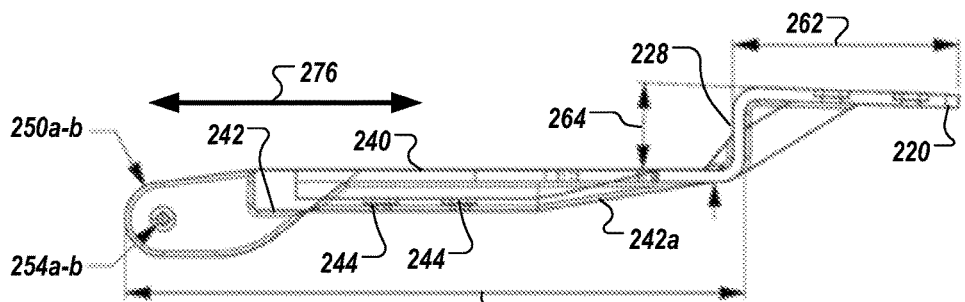
FIG. 2B is a side view drawing of the bracket extension of FIG. 2A according to the first embodiment.
Figure 2C:
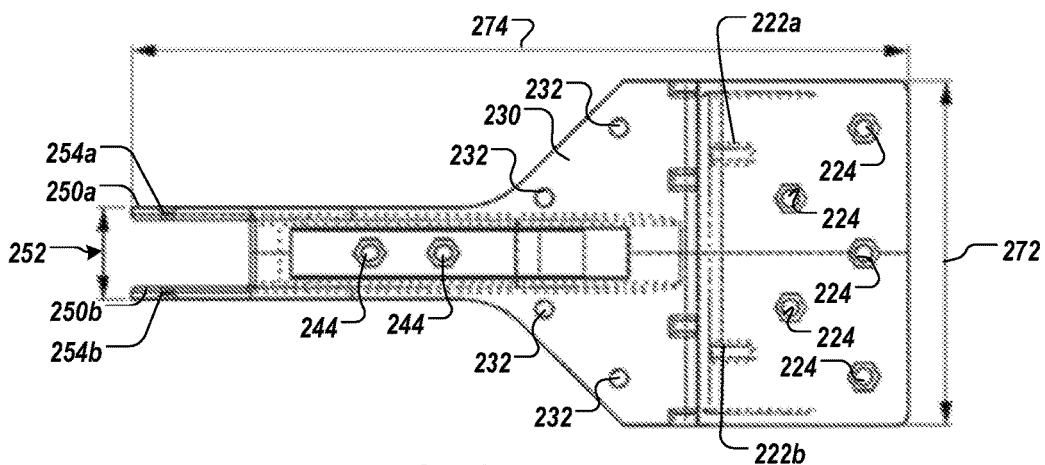
FIG. 2C is a top view drawing of the bracket extension of FIG. 2A according to the first embodiment.

FIG. 2A is a perspective view of an example bracket hinge assembly 200 including a bracket extension 202 and a pivot anchor 204 according to an embodiment. The bracket hinge assembly 200, for example, may be compatible with the shroud 112 of FIG. 1A for use as the bracket hinge assembly 110. FIGS. 2B and 2C are a side view and top view, respectively, of the bracket extension 202 of FIG. 2A according to an example.

The bracket extension 202 can include a mating end 220 having a set of apertures 224, arranged in substantially the same configuration and spacing as a set of apertures 136 of the bin mount 130 (FIG. 1B), and a pair of protrusions 222a-b configured to compliment a tapered shape 134 of the bin mount 130. In an example, the pair of raised guides 222a-b can facilitate alignment of the set of apertures 136 of the bin mount 130 and the set of apertures 224 of the mating end 220 of the bracket extension 202.

In an example illustrated in FIG. 2B, the mating end 220 can include a riser 228 separating the mating end 220, laterally, relative to the extender 240 by a displacement height 264. The height displacement provided by the riser 228, for example, allows for disposition of the protrusions 222a, 222b between a horizontal surface of the mating end 220 and the vertical surface of the rise 228. Further, the riser 228 allows the extension arm 240 to be configured in a different lateral plane than horizontal surface of the mating end 220. This may provide for clearance between the bracket assembly 200 and the curved profile of the inner surface of the storage bin 106. As illustrated in FIG. 2A, a pair of diagonal support members 226a are disposed between the riser 228 and the mating end 220, for example to provide additional structural support and integrity to the stepped shape of the mating end 220. The diagonal support members, for example, create a set of triangular exterior walls parallel to the protrusions 222a, 222b and disposed along opposing edges of the mating end 220.

The mating end 220 of the bracket extension 202 can connect to an extender 240 with a bin mounting surface 230. In an example, the bin mounting surface 230 can include a set of apertures 232 arranged in substantially the same configuration and spacing as the set of apertures 136 of the bin mount 130. In an example, the set of apertures 232 of the bin mounting surface 230 can be used to secure the bracket extension 202 to an upper interior surface of the storage bin 106 using the existing mounting locations previously securing the bin mount 130 in position, and a set of fasteners 280a (illustrated as screws in FIG. 2D) which may be the same fasteners previously securing the bin mount 130 in this location.

Figure 1C:
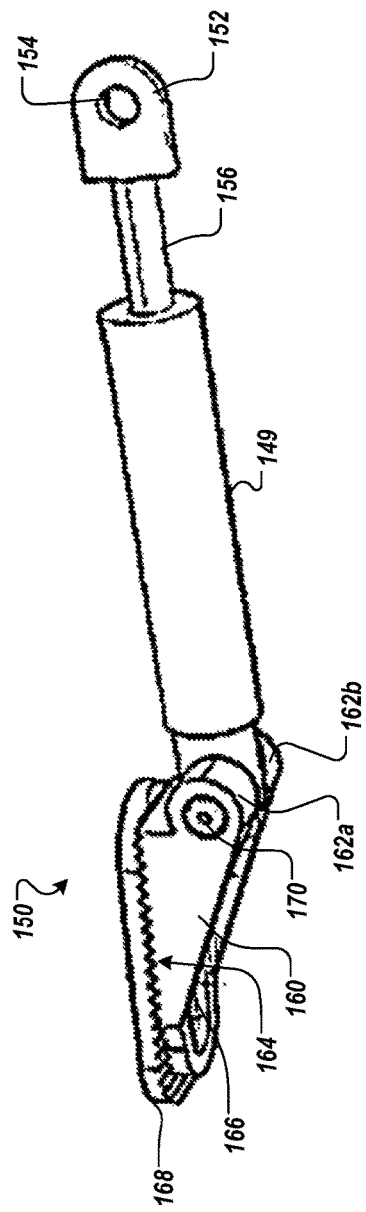
FIG. 1C is an example of a gas strut assembly for aiding in closing and opening the storage bin door.

Closing and opening of the door 102 (see FIG. 1A) can be assisted with use of the gas strut assembly 150 that can help lift and hold the bin door 102 in the open position as well as dampen during a closing movement. The door mount 120, as shown in FIG. 1B, includes a channel 126 at a distal end of a central flange 124 that is intersected by an aperture 128 orthogonal to the channel 126. Turning to FIG. 1C, the gas strut assembly 150 includes a piston end 156 with a flattened distal connector 152 configured to slide into the channel 126 of the door mount 120, as illustrated in FIG. 1A. The flattened distal connector 152 includes an aperture 154 configured to align and secure with the aperture 128 of the central flange 124 according to an example.

In an example, the gas strut assembly 150 can be secured to an upper interior surface of the storage bin 106 using a pivoting anchor 160. The pivoting anchor 160 can be configured to connect to the gas strut 149 using a pin 170 that intersects the gas strut 149 and a pair of flanges 162a-b of the pivoting anchor 160. In an example, the gas strut 149 connects to the extender 240 of the bracket extension 202 with an adjustment plate 168. In an example, the pivoting anchor 160 can include one or more apertures 166 and a scaled or ridged surface 164 configured to lock into a complementary scaled or ridged surface of the adjustment plate 168 for preventing slippage and preventing aligned parts from moving laterally. In an example, the fasteners securing the adjustment plate 168 can be loosened and the pivoting anchor 160 can be re-secured to the adjustment plate 168 at a different point along their scaled surfaces 164, 168.

Figure 2D:
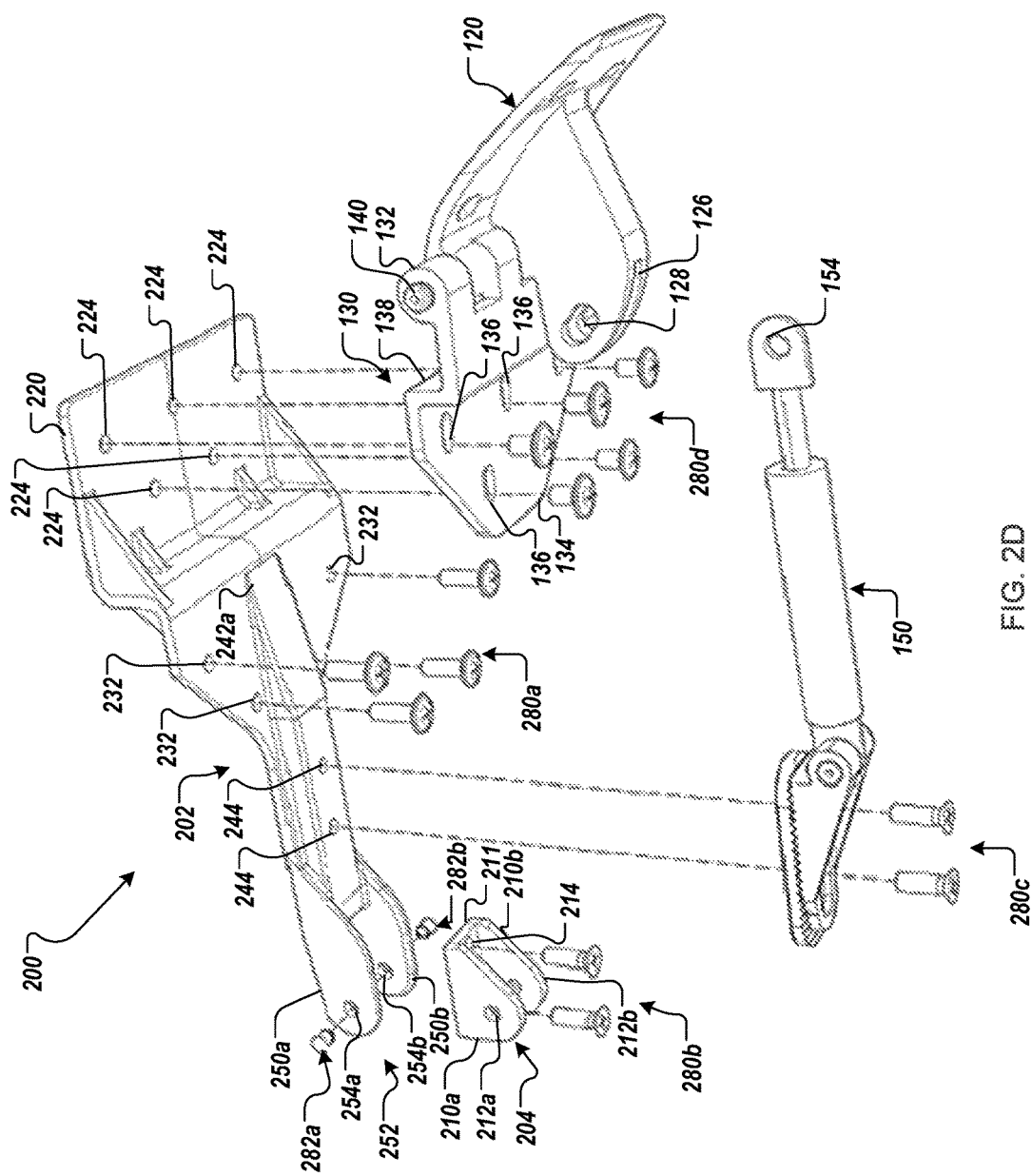
FIG. 2D is an exploded view of the bracket hinge assembly of FIG. 2A including the bracket extension and the pivot anchor configured to secure to existing bin door hardware including the bin door hinge according to the first embodiment.

FIG. 2D is an exploded view of the bracket hinge assembly 200 including the bracket extension 202 and the pivot anchor 204 configured to secure to existing bin door hardware such as the bin mount 130 and strut assembly 150. As shown in FIG. 2D, alignments are illustrated between the bracket hinge assembly 200 and each of the bin mount 130 and the strut assembly 150.

As shown in FIG. 1A, the bin door hinge 108 includes the bin mount 130 hingedly connected to the door mount 120, for example with the pin 140. Returning to FIG. 2D, in an example, the bin mount 130 includes the set of apertures 136 and is configured to secure to the mating end 220 of the bracket extension 202 using a set of fasteners 280d. In an example, the bin mount 130 can have a stepped surface 138 configured to elevate a connecting portion 132 for receiving the pin 140. In an example, the bin mount 130 can have the tapered surface 134 opposite the end mating the door mount 120. In an example, the tapered surface 134 may originally have configured to fit a groove in the storage bin 106 for a securing.

the door mount 120 is configured to connect to the strut assembly 150 by pairing apertures 128 and 154. For example, the strut assembly 150 may be connected to the door mount 120 via a pin or another fastener.

On an opposite end, the strut assembly 150, in some embodiments, is configured to connect to a raised member 242 of the extension arm 240 via a set of apertures 244 within the raised member which provide a mating surface for apertures of the pivoting anchor 160 of the strut assembly 150. The raised member 242 extends substantially from an end of the extension arm connecting to the bin mounting surface 230 to a position between the pair of flanges 250a, 250b of the pivoting second end 252 of the bracket extension 202. The raised member 242, for example, may provide stability and separation to the pair of flanges 250a, 250b as well as an enforced mounting surface for connecting to the strut assembly 150. For example, the raised member 242 receives fasteners 280c extending through the pivot anchor 160 of the strut assembly 150 without allowing the fasteners 280c to extend through the bracket assembly 200 to a position proximate the inner upper surface of the storage bin. In some implementations, the raised member 242 is partially hollow, for example to reduce weight. The raised member 242 extends across a central axis of the bin mounting surface 230 in an extension wedge 242a of the raised member 242. The extension wedge 242a, for example, may provide additional structural stability and strength to the extension arm 240.

In connecting the strut assembly 150 to the extension arm 240 rather than to its conventional mounting position on the inner upper surface of the bin door, for example, the strut assembly 150 is extended in position toward the bin door 102. The relocation of the strut assembly 150, for example, enables adjustment of the extension of the bin door 102 relative to its conventional range of motion.

In some embodiments, the pivoting second end 252 of the bracket assembly 200 is configured for installation in a position formerly mating with the pivot anchor 160 of the strut assembly 150. The pivot anchor 204 of the bracket assembly 200, in some implementations, includes a pair of parallel flanges 210a, 210b connected by a mounting surface 211 including a mounting aperture 214. The pivot anchor 2014, for example, may be configured for releasable attachment to the upper inner surface 106a of the storage bin 106 (e.g., around reference 112 of FIG. 1A) using a set of fasteners 280b configured to connect with the upper inner surface 106a of the storage bin 106 through the apertures 214 of the mounting surface 211 of the pivot anchor 204. The pivot anchor 204 may be configured to pivotably connect to a pivoting second end 252 of the bracket extension 202.

In some implementations, the bracket extension 202 includes a pair of flanges 254 opposite the mating end 220 of the bracket extension 202. The pair of flanges 254 are parallel and separated by the extender 240. Each flange 254a, 254b includes a corresponding aperture 254a, 254b orthogonally positioned in each flange 254a, 254b such that a pin may be extended through the apertures 254a, 254b perpendicular to a longitudinal axis of the extender 240. The flanges 254a, 254b may mount between the flanges 210a, 201b of the pivot anchor 204 such that the apertures 212a, 212b of the pivot anchor are in alignment with the apertures 254a, 254b of the bracket extension 202. At least one pin mechanism may pivotally connect the pivot anchor 204 to the bracket extension 202 about the apertures 212a, 212b, 254a, and 254b. For example, as illustrated in FIG. 2D, a pin 282a may pivotably connect apertures 212a and 254a, while a second pin 282b may pivotably connect apertures 212b and 254b such that the mating end 220 of the bracket extension 202 can rotate down in a maintenance mode (see FIGS. 4B, 7). In an example, the maintenance mode is configured to place the bin door 102a in a swing away position, thereby facilitating ceiling panel removal. To enter maintenance mode, for example, the fasteners 280a connecting the bracket extension 202 to the upper interior surface of the storage bin 106 (as shown in FIG. 2D) may be disconnected, allowing the mating end 220 to drop downward via the pivot anchor 204.

As illustrated in FIGS. 2B and 2C, respectively, in some embodiments, the mating end 220 of the extension bracket 200 can have a length 262 and width 272 configured to secure to the door mount 120 of the bin door hinge 108 (shown in FIG. 1A). Further, the extender 240 has a length 266, providing for a combined extension bracket length of 274. The length 274, for example, may provide reconfiguration of a mounting position of an upper edge 602a of a bin door 602a (shown in FIG. 6B) such that mounting angle of the bin door 602a is reduced, providing additional volume within the storage bin. Where the door mount 130, for example, used to connect with an upper surface of the storage bin 106, the door mount 130 connects to the mating end 220 of the extension bracket 200 which extends between the door mount 130 and the prior mounting position of the strut assembly 150. This allows for shifting of the mounting positions of the strut assembly 150 and the door mount 130 by approximately a length between the position of the pivot anchor 204 (e.g., about the pivot end 252 of the hinge assembly 200 and a position of the apertures 244 of the extension arm 240, providing connection to the strut assembly 150. This is illustrated, for example, in FIG. 2B as a length 276.

In an example, portions of the bracket hinge assembly 200, 300 can be formed from a stamped metal such as aluminum, or from a mold or 3D printed part using a plastic and/or composite material. In another embodiment, portions of the existing hardware ban be combined with portions of the bracket hinge assembly 200, 300 to make a single unit (not shown). For example, the bracket extension 202 can be combined with the bin mount 130 of the bin door hinge 108.

To enable interoperability of the bracket extension 202 with preexisting bracket hinge assemblies of various manufacturers, in some embodiments, a greater number of apertures are provided on the bracket extension 202 than required for interfacing with various bin door attachments, thus enabling manufacture of a same apparatus for installation in a variety of storage bin configurations. In a further example, rather than being round, apertures of the bracket extension may be provided in elongated slots or ovals such that the apertures of the bracket extension tolerate minor misalignment with the bin door attachment.

A method for retrofitting an aircraft cabin with the bracket hinge assembly 200 of FIG. 2A, for example, may include detaching the pivoting anchor 160 connecting the gas strut assembly 150 from an upper surface of a stowage bin.

The method may further include unfastening a bin door hinge 108 from a mounting position on the upper surface of the stowage bin.

The method may include installing the pivoting anchor 160 connecting the gas strut assembly 150 to the bracket extension 202. For example, the gas strut assembly 150 may connect to the extender 240 of the bracket extension 202 via at least one fastener aperture, such as the set of apertures 244 illustrated in FIG. 2D.

The method may further include fastening the bin door hinge 108 to the mating end 220 of the bracket extension 202. For example, the bin door hinge 108 may connect to the bracket extension 202 via the apertures 136 of the bin mount 130 aligning with mated apertures 224 of the mating end 220 of the bracket extension 202.

The method may further include connecting the pivot anchor 204 to the end of the bracket extension 202. The bracket extension 202, for example may be pivotally attached to apertures 212 of the pivot anchor 204 via apertures 254 using a pivoting fastener such as one or more pins 282.

The method may include fastening the pivot anchor 204 to a position on the upper surface of the stowage bin proximate a former mounting location of the gas strut assembly 150. For example, apertures configured to mate with fasteners 280b used to connect the gas strut assembly 150 to the upper surface of the stowage bin may be repurposed for connecting the pivot anchor 204 to the upper surface of the stowage bin.

Figure 3A:
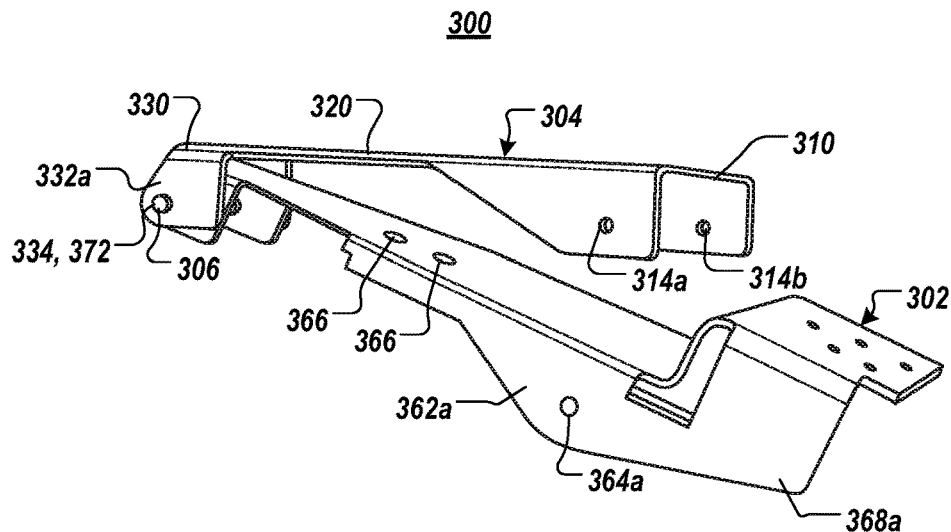
FIG. 3A is a perspective view of a bracket hinge assembly including a storage bin bracket and a bracket extension according to a second embodiment.
Figure 3B:
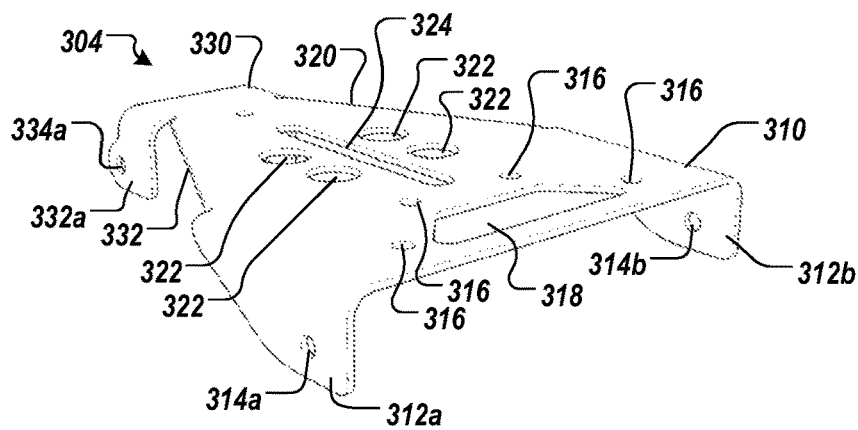
FIG. 3B is a top right perspective drawing of a storage bin bracket configured for a quick release, the storage bin bracket having a first end including a flange on each lateral side, each flange having an aperture, a middle section configured to attach to the storage bin, and a second end including a flange on each lateral side, each flange having an aperture according to the second embodiment.
Figure 3C:
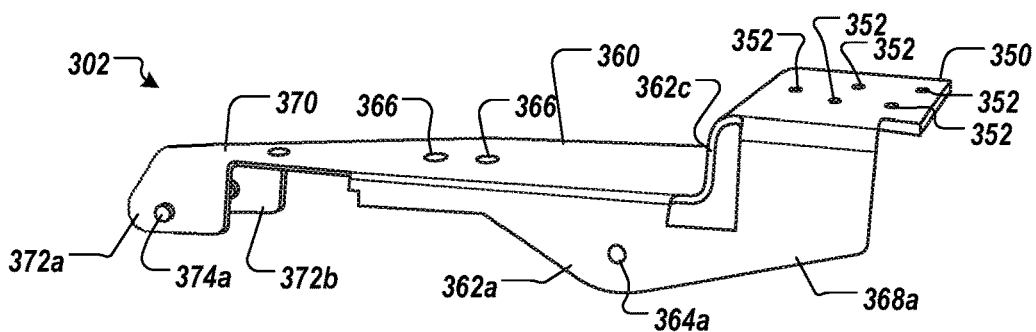
FIG. 3C is a side view drawing of a bracket extension including a quick release according to the second embodiment.
Figure 4B:
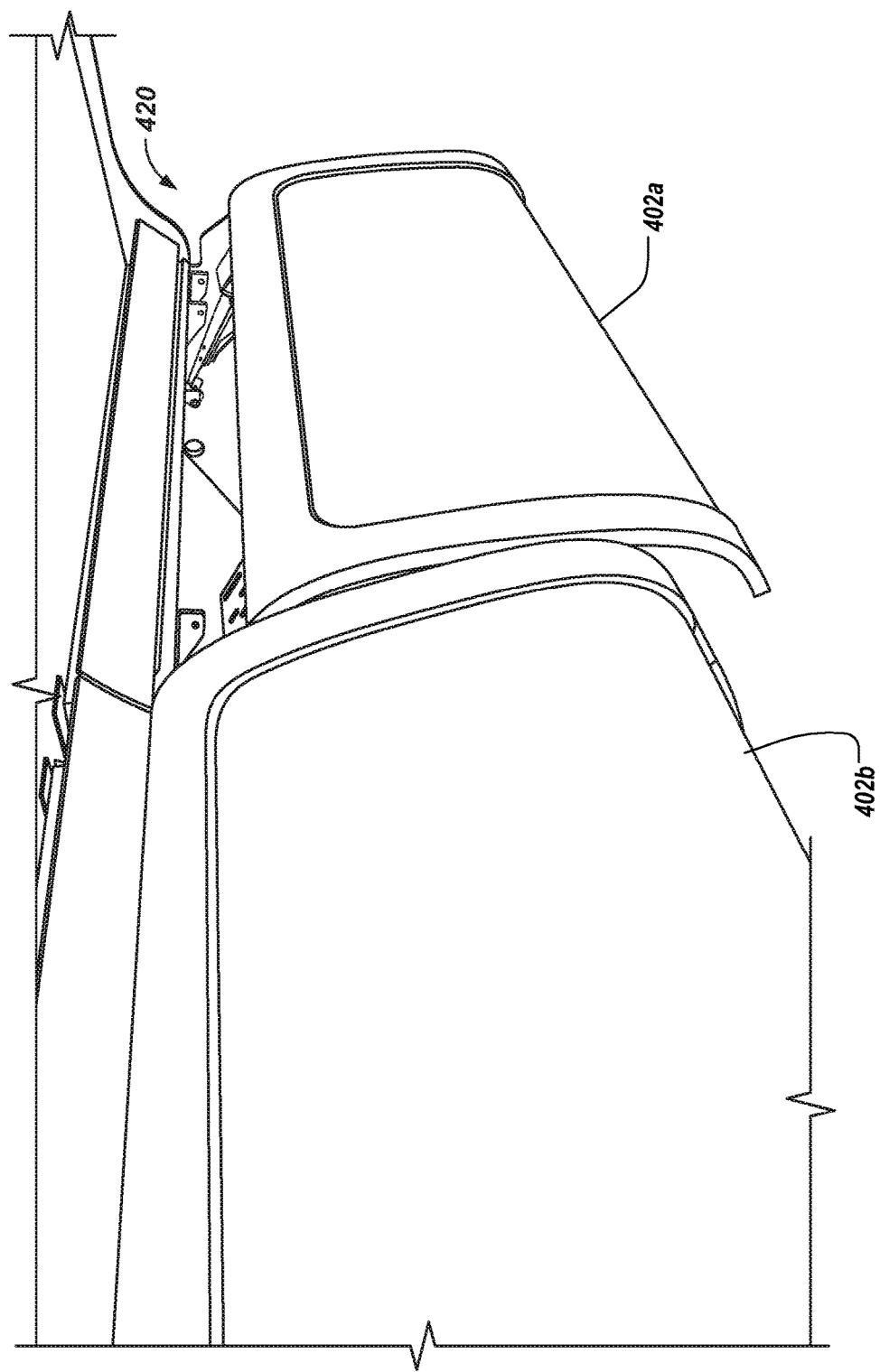
FIG. 4B is a perspective view of a storage bin door connected to the overhead storage bin using the bracket hinge assembly of FIG. 3A, where the bracket hinge assembly is configured to place the storage bin door in a maintenance mode according to an embodiment.
Figure 7:
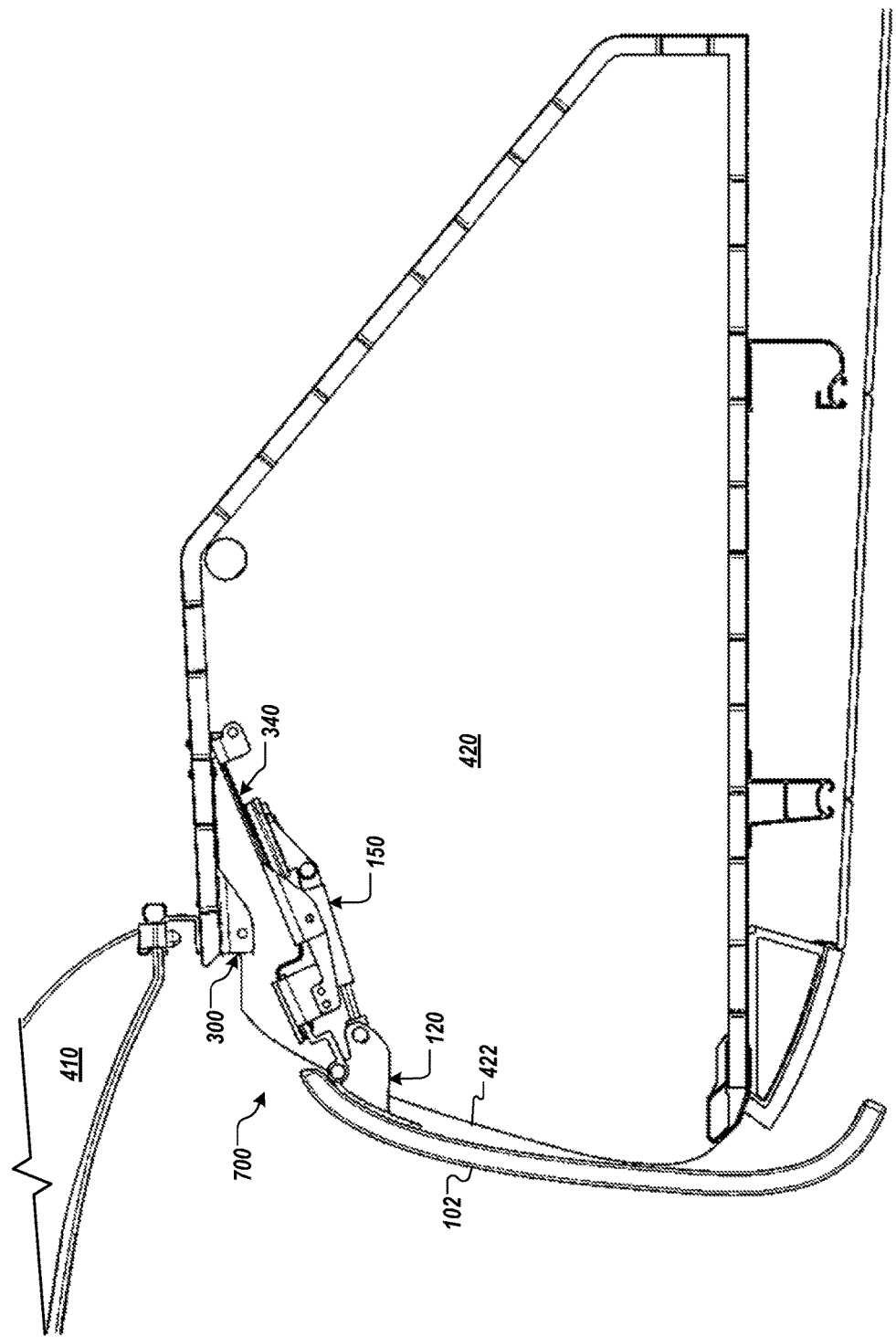
FIG. 7 is a cross-section of the bin door connected to the overhead storage bin using the bracket hinge assembly of FIG. 3A, where the bracket hinge assembly is configured to place the bin door in the maintenance mode according to an embodiment.

In another embodiment, as shown in FIGS. 3A-3C, a quick release bracket hinge assembly 300 can include a quick release to lower down the bin door 102 into the maintenance mode (See FIGS. 4B, 7). In an example, a quick release bracket hinge assembly 300 can include a bin bracket 304 configured to secure to an upper interior surface of the storage bin 106 and a quick release bracket extension 302 configured to connect to the door mount 120 of the bin door hinge 108. In this scenario, the bin bracket 304 replaces the pivot anchor 204 and the quick release bracket extension 302 replaces the bracket extension 202.

Turning to FIG. 3B, a top left perspective drawing of a bin bracket 304 is shown having a first end 310 including a pair of flanges 312a-b on each lateral side, each flange 312a-b having an aperture 314a-b, as well as a set of apertures 316 configured to secure to the bin mount 130 using a set of fasteners 280d (see FIG. 2D). In an example, the first end 310 can include central aperture 318 for structural support. The pair of flanges 312a-b of the first end 310 can extend to a bin mounting section 320 of the bin bracket 304 which includes a set of apertures 322 arranged in substantially the same configuration and spacing as the set of apertures 136 of the bin mount 130 which are configured to align with the existing mounting locations previously securing the bin mount 130 in position, to attach the bin bracket 304 to the storage bin 106 using the set of fasteners 280a (FIG. 2D) which may be the same fasteners previously securing the bin mount 130 in this location. In an example, the bin mounting section 320 can include an elongated aperture 324 configured to adjust an attachment location of variations of a bin bracket and storage bin combination.

The bin bracket 304 can include a second end 330 tapering 332 from the bin mounting section 320, which includes a pair of flanges 332a-b on each lateral side, each flange 332a-b having an aperture 334a-b according to an example.

FIG. 3C is a side view illustration of a bracket extension 302 including a mating end 350, an extending section 360 having a pair of flanges 362a, 362b, and a pivoting second end 370 having a pair of flanges 372a-b configured to complement the pair of flanges 332a-b of the bin bracket 304 according to an example.

In some embodiments, the mating end 350 includes a set of apertures 352 arranged in substantially the same configuration and spacing as the set of apertures 136 of the bin mount 130. In an example, the extending section 360 further includes a set of apertures 366 arranged in substantially the same configuration and spacing as the adjustment plate 168 and the pivoting anchor 160 of the strut assembly 150. The set of apertures 366 can be securing locations for the strut assembly 150 according to an example.

In some embodiments, spacing of the pair of flanges 372a-b is configured to be more narrow than the pair of flanges 332a-b. In an example, each flange 362a, 362b has an aperture 364 configured to align with the aperture 314 of the flange 312 of the first end of the bin bracket 304. In an example, the aperture 334 of the bin bracket 304 is configured to secure to an aperture 374a-b of the pivoting second end 370 of the bracket extension 302, while also forming a joint for rotation. In an example, the bin bracket 304 and the bracket extension 302 can be secured at the apertures 314a-b, 364a-b using a pin, rod, or other quick release mechanism.

In an example, the mating end 350 can be structurally reinforced by a pair of extensions 368a-b connecting each flange 362a, 362b to both lateral sides of the mating end 350. In another example, a flange 362c extending from the extending section 360 to the mating end 350 can also provide mechanical support to the mating end 350.

The pair of flanges 362 are parallel and separated by the mating end 350. Each flange 362a, 362b includes a corresponding aperture 364a, 364b orthogonally positioned in each flange 362a, 362b such that a pin may be extended through the apertures 364a, 364b perpendicular to a longitudinal axis of the mating end 350. The flanges 372a, 372b may mount between the flanges 332a, 332b of the bin bracket 304 such that the apertures 314a, 314b of the bin bracket 304 are in alignment with the apertures 362a, 362b of the bracket extension 302. At least one pin mechanism may pivotally connect the bin bracket 304 to the bracket extension 302 about the apertures 314a, 314b, 362a, and 362b. For example, as illustrated in FIG. 3A, a first pin 306, or alternatively a pair of plugs, may pivotably connect apertures 334a, 372a and 334b, 372b, while a second pin, or alternatively a pair of plugs, may pivotably connect apertures 314a, 364a, and 314b, 364b such that the mating end 350 of the bracket extension 302 can rotate down in a maintenance mode (see FIGS. 4B, 7).

A method for retrofitting an aircraft cabin with the bracket hinge assembly of FIGS. 3A-3C, for example, may include detaching a pivoting anchor 160 connecting the gas strut assembly 150 to an upper surface of a stowage bin.

The method may further include unfastening a bin door hinge 108 from a mounting position on the upper surface of the stowage bin.

The method may include installing the pivoting anchor 160 connecting the gas strut assembly 150 to the quick release bracket extension 302. For example, the pivot anchor 160 of the gas strut assembly 150 may connect to the extending section 360 of the quick release bracket extension 302 via at least one fastener aperture 366.

The method may further include fastening the bin door hinge 108 to the mating end 350 of the quick release bracket extension 302. For example, the bin door hinge 108 may connect to the quick release bracket extension 302 via apertures 136 of the bin mount 130 aligning with mated apertures 352 of the mating end 350 of the quick release bracket extension 302.

The method may further include connecting the bin bracket 304 to the end 370 of the quick release bracket extension 302. The quick release bracket extension 302, for example, may be pivotally attached to apertures 374 of the bin bracket 304 via apertures 334 using a pivoting fastener such as one or more pins.

The method may include fastening the bin bracket 304 to a position on the upper surface of the stowage bin proximate a former mounting location of the gas strut assembly 150. For example, apertures configured to mate with fasteners used to connect the gas strut assembly 150 to the upper surface of the stowage bin may be repurposed for connecting the bin bracket 304 to the upper surface of the stowage bin via aperture 324.

As best illustrated in FIG. 4A, a bin door 402a is connected to a storage bin using a bracket assembly for extending the hinge position of the bin door 402a, such as the bracket assembly 200 described in relation to FIGS. 2A-D or the bracket assembly 300 described in relation to FIGS. 3A-C. FIG. 4A illustrates a difference between a bin door 402b, having an existing bin door orientation, and bin door 402a mounted with a bracket extension assembly, thus forming an extra volume produced by a gap 410 between a former mounting position and the present mounting position. Using the bracket hinge assembly 200 or 300, for example, a mounting angle of the bin door 402a is adjusted within a range of about 5 degrees closer to vertical to 20 degrees closer to vertical. For example, the bracket hinge assembly 200 or 300 may modify the mounting angle of the bin door 402a by at least 12 degrees closer to vertical. In this configuration, the gap 410, for example, may provide clearance to an upper set of carry-on luggage wheels or other carry on item feature that may not otherwise be afforded clearance when the bin door is mounted at the steeper angle illustrated in FIG. 4A. Although FIG. 4A illustrates the gap 410 between the bin doors 402a, 402b as an opening for viewing within the stowage bin interior space, it may be noted that, in an installed configuration, each stowage bin may be configured with the same bracket hinge extension apparatus such that the bin doors 402 are in alignment in the closed (stowed) position.

Figure 4C:
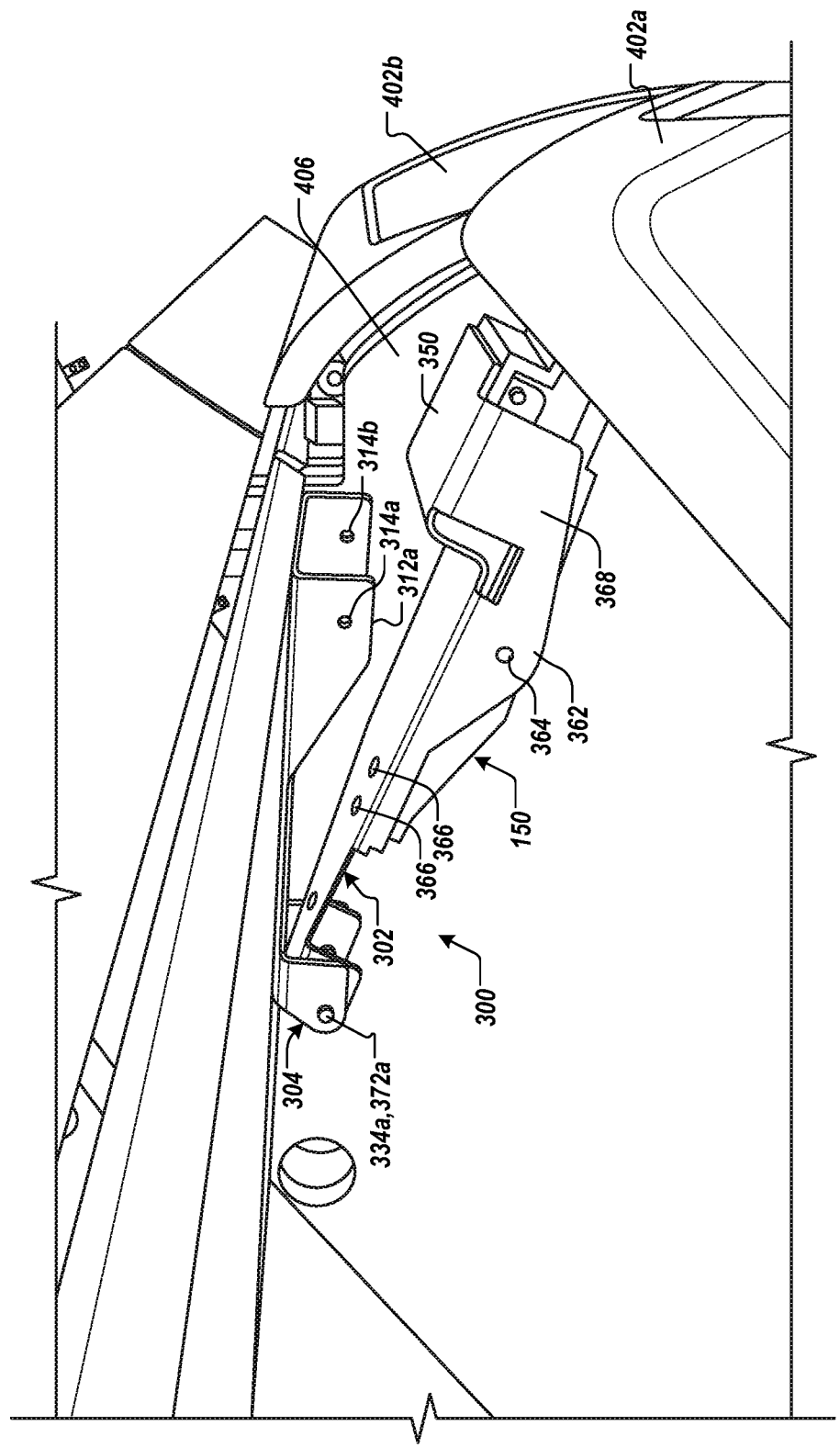
FIG. 4C is an enlarged perspective view of the bracket hinge assembly configured to place the storage bin door in the maintenance mode according to the embodiment of FIG. 4B.

The maintenance mode is shown in FIG. 4B, demonstrating a perspective view of a bin door 402a connected to a storage bin 406 using the quick release bracket hinge assembly 300, where the quick release bracket extension 302 is shown pivoted downward 420, thereby lowering the bin door 402a according to an example. The bin door 402a, for example, may be lowered by at least 1 inch, at least two inches, or over three inches vertically using the quick release bracket hinge assembly 300. FIG. 4C is an enlarged perspective view of the quick release bracket hinge assembly 300 showing the bin bracket 304 and the bracket extension 302 secured at the apertures 334, 374 and released at the apertures 314, 364.

Figure 5A:
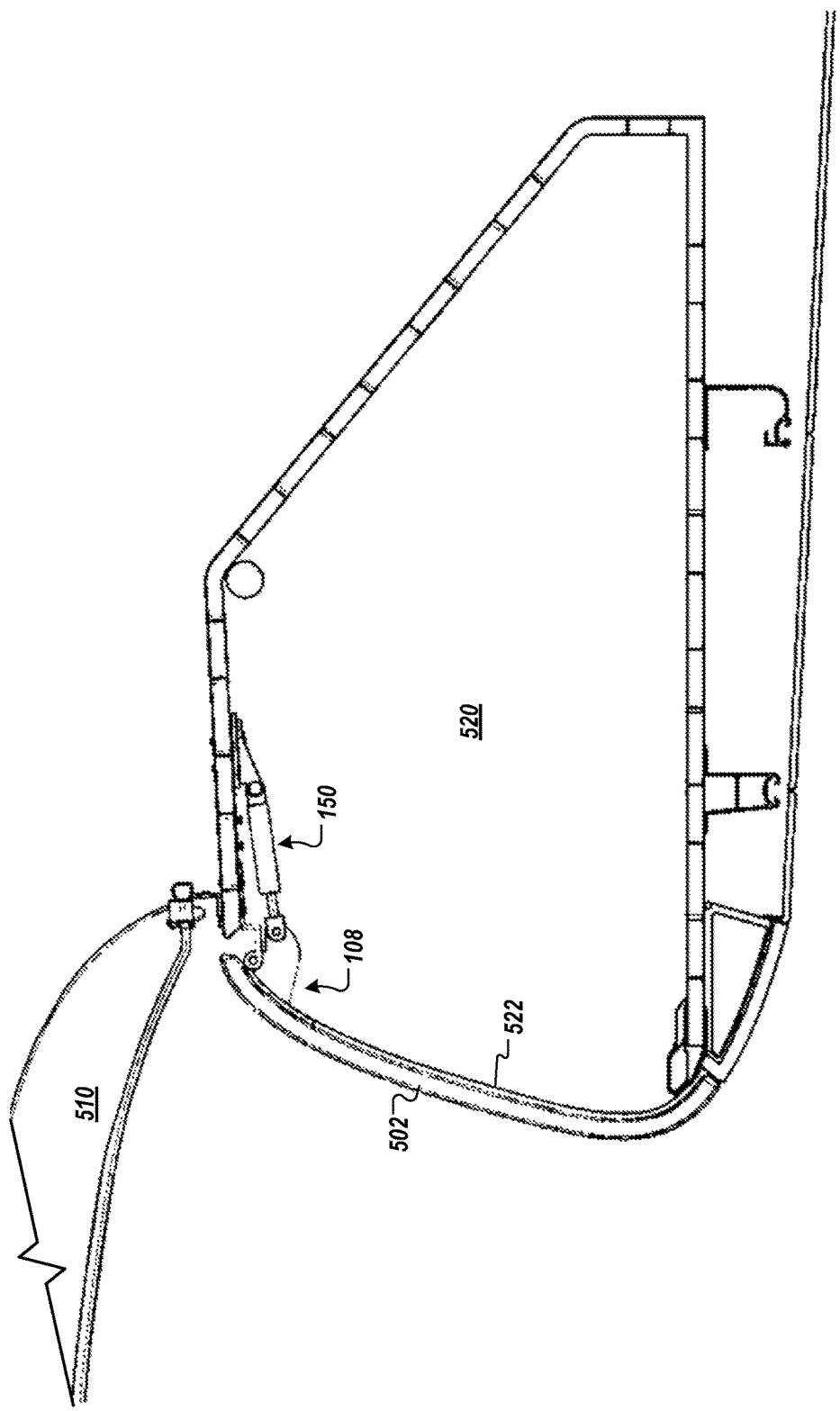
FIG. 5A is a cross-section of a portion of an aircraft compartment including a ceiling panel section, a storage bin section having a front bin edge, and a hinge portion connecting the bin door to the storage bin using existing hinge hardware according to an embodiment.
Figure 5B:
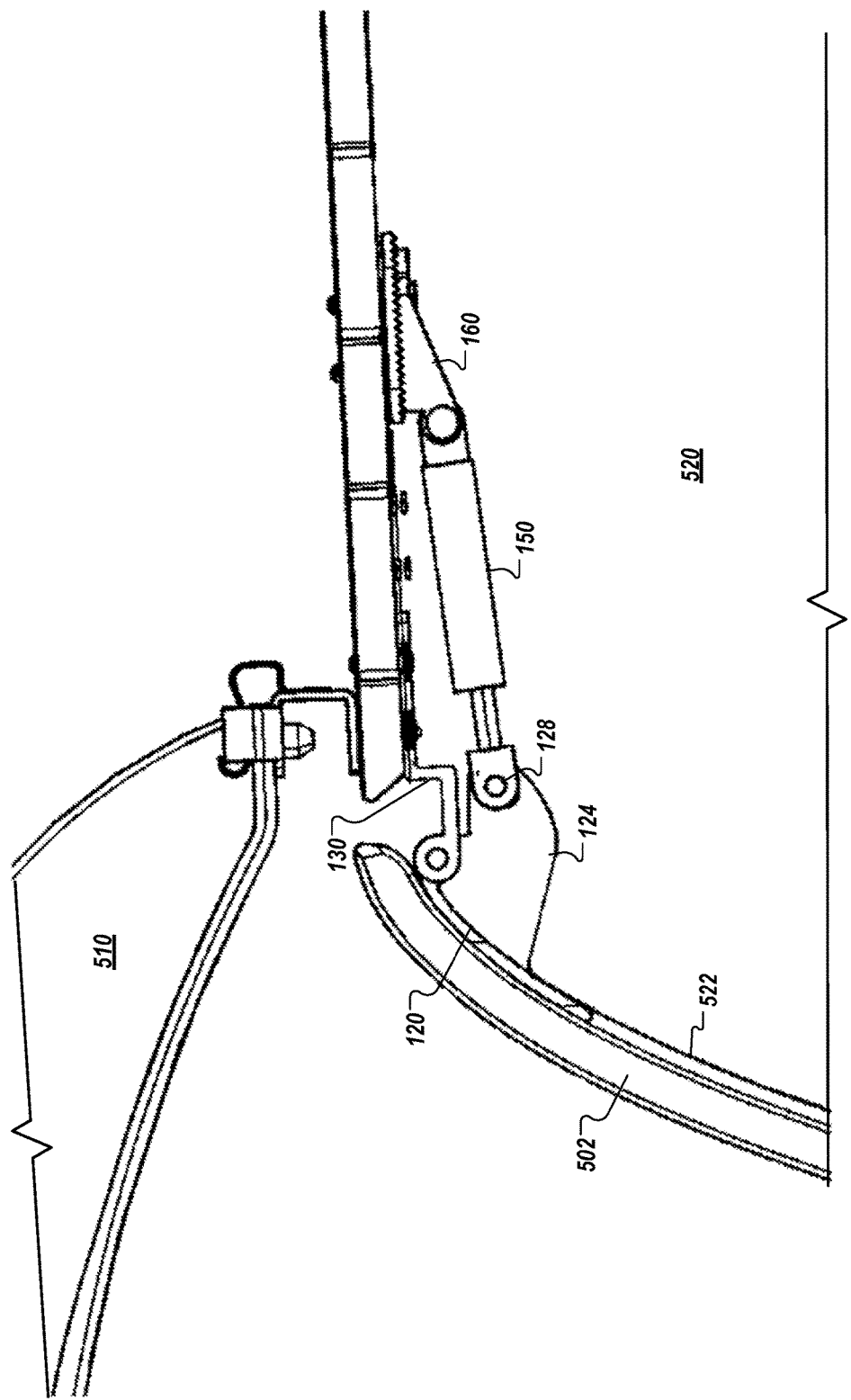
FIG. 5B is an enlarged view of a hinge portion of FIG. 5A showing the bin door connected to the existing bin door attachment and damper according to an embodiment.

Benefits of using the disclosed bracket hinge assembly 200 and the bracket hinge assembly 300 can be demonstrated by comparing to the existing hardware setup. FIG. 5A is a cross-section of a portion of an aircraft compartment including a ceiling panel section 510, a storage bin section 520 having a front bin edge 522, and a hinge portion connecting a bin door 502 to the storage bin using existing hinge hardware according to an example. FIG. 5B is an enlarged view of a hinge portion of FIG. 5A showing the bin door 502 connected to the bin door hinge 108 and strut assembly 150 according to an example.

Figure 6B:
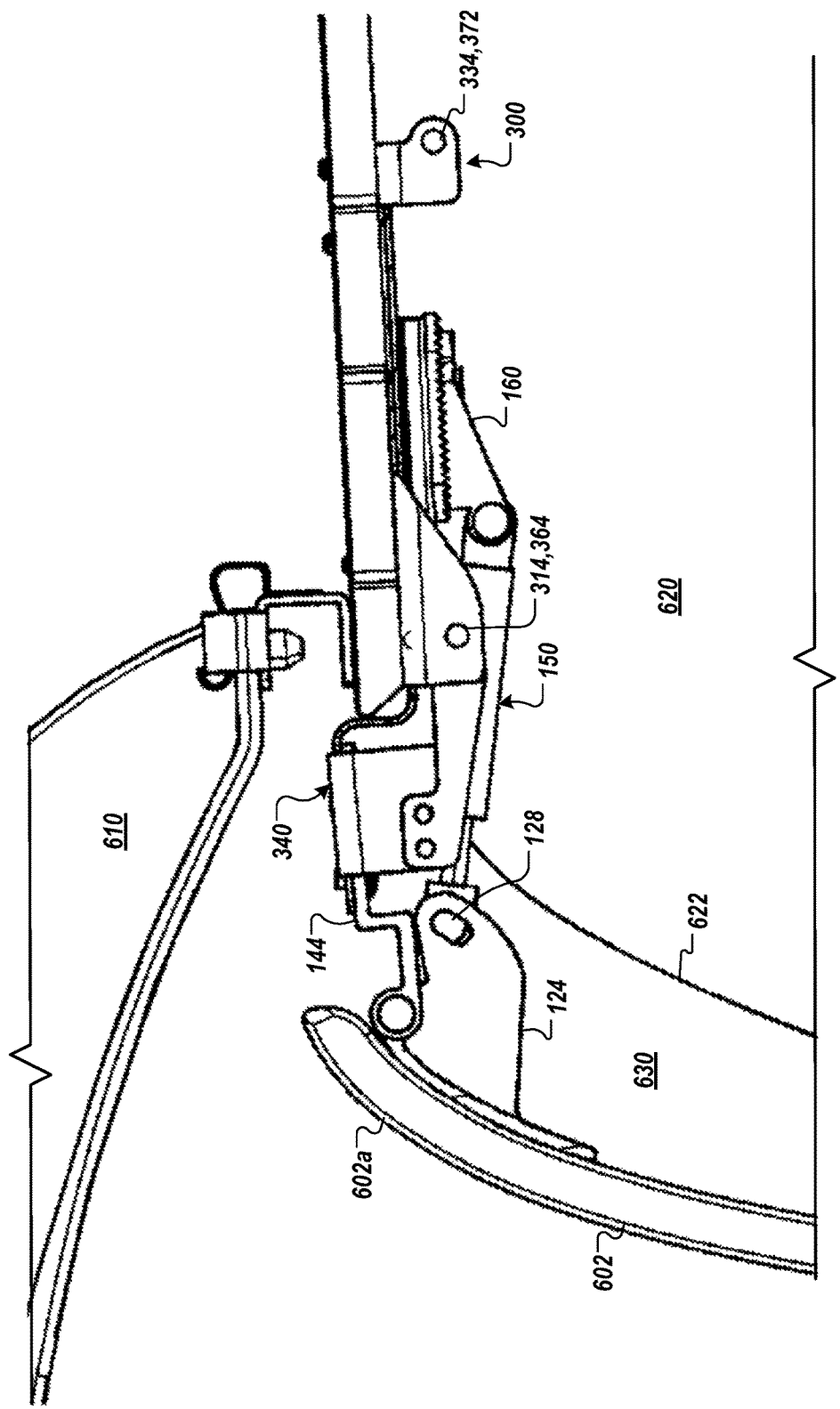
FIG. 6B is an enlarged view of a hinge portion of FIG. 6A showing the bin door connected to the storage bin using the bracket hinge assembly, the existing bin door attachment, and damper according to an embodiment.

FIG. 6A is a cross-section of a portion of an aircraft compartment including a ceiling panel section 610, a storage bin section 620 having a front bin edge 622, and a hinge portion connecting a bin door 602 to the storage bin using the bracket hinge assembly 300 shown in FIGS. 3A-3C according to an example. FIG. 6B is an enlarged view of a hinge portion of FIG. 6A showing the bin door 602 connected to the storage bin using the bracket hinge assembly 300, the bin door hinge 108, and strut assembly 150 according to an example. The bin door 602 is noticeably separated from the front bin edge 622 of the storage bin section 620 providing extra storage space 630.

Further demonstrating the benefit of using the disclosed bracket hinge assembly 200 of FIG. 2A and the quick release bracket hinge assembly 300 of FIG. 3A, FIG. 7 shows the bin door 102 placed in a maintenance mode 700. In an example, once the optional cover 112 and the quick release fastener are removed, the quick release bracket hinge assembly 300 is configured to pivot downwardly and place the bin door 102 in a maintenance mode 700.

As discussed above, the bracket hinge assembly 200 of FIG. 2A and the quick release bracket hinge assembly 300 of FIG. 3A may provide the benefits of increased storage volume in overhead stowage bins through decreasing a mounting angle of the bin door of the stowage compartment. Due to the decrease in mounting angle, for example, the bracket hinge assemblies may provide additional clearance for upper wheels of a wheeled luggage, handles, or other features of carry-on passenger items.

The bracket hinge assembly 200 of FIG. 2A and the quick release bracket hinge assembly 300 of FIG. 3A may be designed for retrofit replacement using preexisting bin door hardware such that only a portion of the preexisting bin door securing apparatus is replaced. Further, in some implementations, one or more fastener apertures or other bracket features may be designed for interoperability with preexisting hardware supplied by various original equipment manufacturers (OEMs). In this manner, the bracket hinge assemblies 110, 200, 300 may be universally installed as retrofit solutions in existing passenger cabin configurations.

While certain embodiments have been described, these embodiments have been presented by way of example only, and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures.

What is claimed is:

1. An aircraft storage bin comprising:
   a storage bin including an upper surface;
   a door, wherein the door and the storage bin at least partially define an enclosed storage bin space when the door is in a closed position;
   a pivot mount attached to the upper surface of the storage bin;
   a hinge body member extending from the pivot mount toward the door of the storage bin, the hinge body member having a first portion rotatably coupled to the pivot mount and having a second portion releasably attached to the upper surface of the storage bin such that the second portion can pivot downwardly when the second portion is released from the upper surface;
   a piston member carried by the hinge body member, the piston member having a first end coupled to the hinge body member and a second end coupled to the door such that the piston member is carried downwardly when the hinge body member pivots downwardly, wherein the piston member actuates as the door is moved from the closed position to an open position; and
   an extension member that bridges a gap between the door and the upper surface of the storage bin, the extension member having an end hingedly coupled to the door;
   wherein the gap corresponds to a distance that an upper edge of the door is positioned laterally relative to a position of the edge prior to installation of the extension member, such that the enclosed storage bin space after installation of the extension member is larger relative to the storage bin space prior to installation of the extension member.

2. The storage bin of claim 1, wherein the hinge body member is configured to permit the door to be translated downwardly to permit access to and removal of ceiling panels without removing the door from the storage bin.

3. The apparatus of claim 1, wherein a mounting position of the first end of the piston member is adjustable relative to the hinge body member.

4. The apparatus of claim 1, wherein the extension member is integrally formed with the hinge body member.

5. The apparatus of claim 1, wherein the hinge body member is releasably attached to the upper surface of the storage bin via at least one flange extending from the upper surface of the storage bin.

6. The apparatus of claim 1, wherein the hinge body member is releasable from the upper surface of the storage bin by removal of at most two pins or fasteners.

7. The apparatus of claim 1, further comprising a shroud member substantially covering the hinge body member and the pivot mount.

8. The apparatus of claim 1, wherein the enclosed storage bin space after installation of the extension member is at least 5 percent larger relative to the storage bin space prior to installation of the extension member.

9. The apparatus of claim 1, wherein the enclosed storage bin space after installation of the extension member is at least 10 percent larger relative to the storage bin space prior to installation of the extension member.

10. The apparatus of claim 1, further comprising a second hinge body member, a second piston member and a second extension member spanning the gap.

11. A method of retrofitting an aircraft storage bin comprising an upper surface and a door, wherein the door and the storage bin at least partially define an enclosed storage bin space when the door is in a closed position, the method comprising:
    attaching a pivot mount to the upper surface of the storage bin;
    installing a hinge body member extending from the pivot mount toward the door of the storage bin, the hinge body member having a first portion rotatably coupled to the pivot mount and having a second portion releasably attached to the upper surface of the storage bin such that the second portion can pivot downwardly when the second portion is released from the upper surface;
    installing a piston member carried by the hinge body member, the piston member having a first end coupled to the hinge body member and a second end coupled to the door such that the piston member is carried downwardly when the hinge body member pivots downwardly, wherein the piston member actuates as the door is moved from the closed position to an open position; and installing an extension member that bridges a gap between the door and the upper surface of the storage bin, the extension member having an end hingedly coupled to the door;

wherein the gap corresponds to a distance that an upper edge of the door is positioned laterally relative to a position of the edge prior to installation of the extension member, such that the enclosed storage bin space after installation of the extension member is larger relative to the storage bin space prior to installation of the extension member.

12. The method of claim 11, wherein the hinge body member is configured to permit the door to be translated downwardly to permit access to and removal of ceiling panels without removing the door from the storage bin.

13. The method of claim 11, wherein a mounting position of the first end of the piston member is adjustable relative to the hinge body member.

14. The method of claim 11, wherein the extension member is integrally formed with the hinge body member.

15. The method of claim 11, wherein the hinge body member is releasably attached to the upper surface of the storage bin via at least one flange extending from the upper surface of the storage bin.

16. The method of claim 11, wherein the hinge body member is releasable from the upper surface of the storage bin by removal of at most two pins or fasteners.

17. The method of claim 11, further comprising installing a shroud member substantially covering the hinge body member and the pivot mount.

18. The method of claim 11, wherein the retrofitted enclosed storage bin space after installation of the extension member is at least 5 percent larger relative to the storage bin space prior to installation of the extension member.

19. The method of claim 1, wherein the retrofitted enclosed storage bin space after installation of the extension member is at least 10 percent larger relative to the storage bin space prior to installation of the extension member.

20. The method of claim 11, further comprising installing a second hinge body member, a second piston member and a second extension member spanning the gap.

* * * * *